Patented June 21, 1932

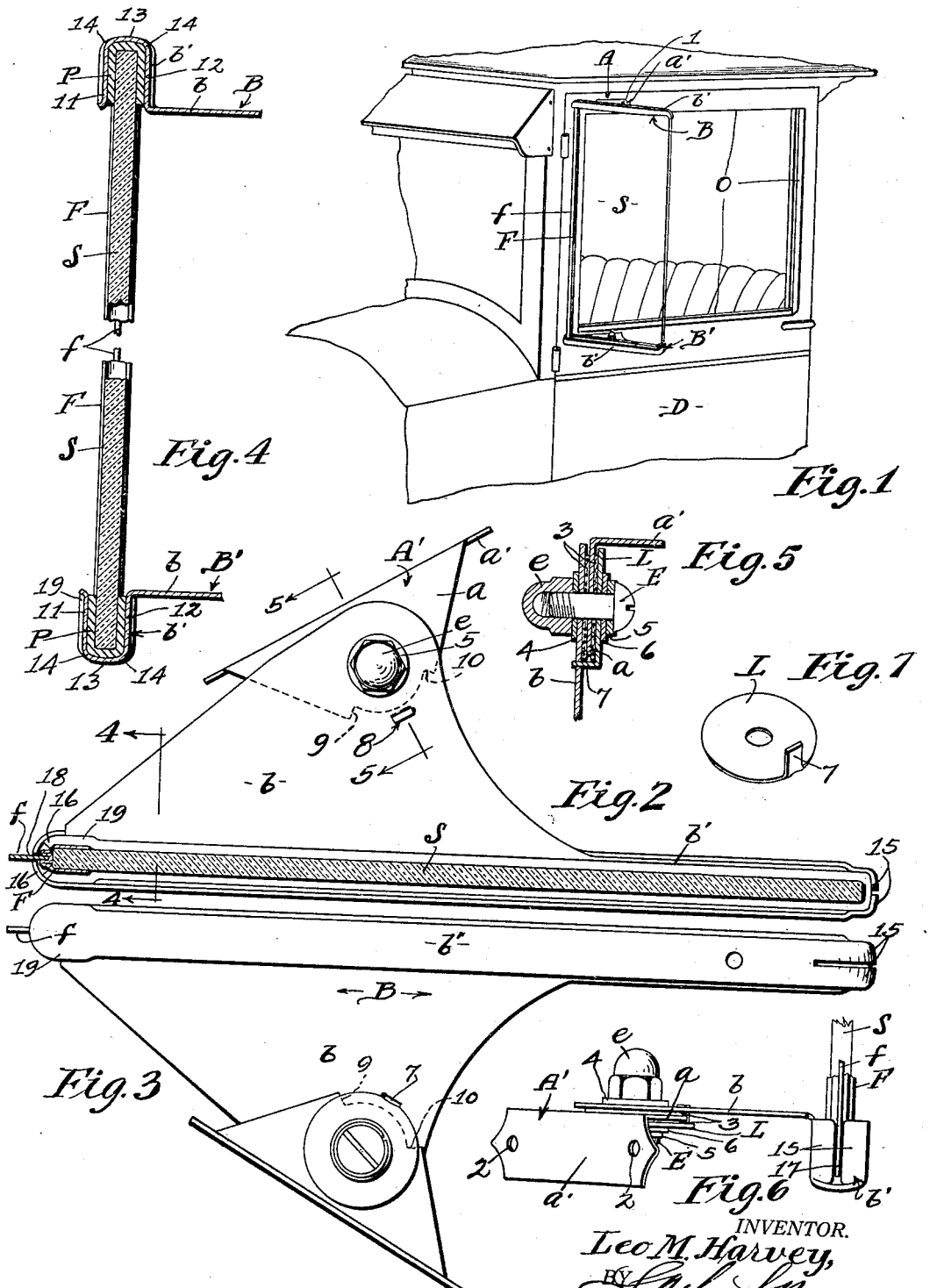

1,863,629

UNITED STATES PATENT OFFICE

LEO M. HARVEY, OF LOS ANGELES, CALIFORNIA

WINDSHIELD FOR CLOSED MOTOR CARS

Application filed October 2, 1928. Serial No. 309,815.

This invention relates in general to windshields for closed motor cars, but more particularly to auxiliary windshields adapted to be positioned on the sides of the cars forwardly of the window openings on and attached to the doors. The object is to provide a simple, economical and a practical windshield adjustable as to angle relative to the side of the car for holding a glass operatively in position and in such a manner that it will not obscure the vision.

Another object is to provide an improved type of windshield bracket preferably formed of an integral piece of sheet metal and provided with a channeled glass receiving portion so formed that the end of a glass shield may be frictionally held therein by the tension of the channeled portions, thus eliminating the necessity for clamping the glass on the bracket.

Another object is to form the channeled glass receiving portion of the bracket with two substantially parallel side portions and an intermediate portion which is arcuately formed and is rounded at its junctions with the side portions of the channel in such a manner that when the sides are extended for forcing a glass into position in the bracket the channeled portion of the bracket will flex more readily without danger of breaking at the corners.

Another object is to provide improved means for adjustably attaching the brackets to the doors of a car so that the windshields may be selectively moved to desired angles within predetermined limits and held at such angles.

Other objects may appear as the description progresses.

In the consideration of this invention I refer to Letters Patent No. 1,552,332, granted Sept. 1st, 1925, jointly to myself and Chester D. Miller, for windshields of the same general character as the present invention, over which I have provided in the present invention substantial improvements in structure, manner of attachment, and means for supporting a glass in position on the brackets. I have shown a preferred form of invention in the accompanying drawing, in which Fig. 1 is a fragmentary perspective view of a motor car with one of my improved windshields attached thereto.

Fig. 2 is an enlarged sectional plan of the windshield showing a top view of one of the supporting brackets.

Fig. 3 is a corresponding view of the reverse side of one of the brackets.

Fig. 4 is a sectional elevation on line 4—4 of Fig. 2 of the windshield partially broken away to show details of the structure.

Fig. 5 is a section of one of the brackets on line 5—5 of Fig. 2.

Fig. 6 is an end view of the lower bracket with the windshield partly broken away.

Fig. 7 is a perspective view of a locking disc, one of which is connected with each of the supporting brackets for limiting the movement of the windshield.

As shown in the drawing and briefly described, my invention embodies a windshield S, preferably of plate glass, which is pivotally attached forwardly of the opening O of the door D of a car by means of a pair of brackets B and B' which are pivotally connected with attaching members A and A'. The members B and B' are identical except that one is right handed and the other left handed, and the same is true of the attaching members A and A'.

Each of the members B and B' is provided with a horizontal web portion $b$ and a channeled glass receiving portion $b'$. The members A and A' are integrally formed of sheet metal and are provided with a horizontal web portion $a$ and depending attaching flanges $a'$. The attaching members are adapted to rest against the sides of the door D at points above and below the window opening O and are attachable to the doors by means of screws, as at 1, which extend through perforations 2, 2 in the flanges $a'$ and into the frame of the door D.

The brackets B and B' are pivotally mounted on the attaching members A and A' respectively by means of screws E having cap nuts $e$ threaded onto the ends thereof. Said screws E extend through the web portions $a$ and $b$ of the attaching members and the brackets respectively and a friction washer, as at 3, is provided on opposite sides of the portion $a$ of the attaching members and between said portion and the web $b$ of the brackets, and also between said portion $a$ and the locking disc L, as shown in Fig. 5.

A metal washer 4 is preferably provided between the nuts $e$ and the web $b$ and one or more washers, as at 5 and 6, are provided between the head of the screw E and the locking disc L, the washer 5 being preferably a split lock washer for preventing the turning of the screw when the brackets are moved pivotally on the attaching members. The locking disc L, as shown in Fig. 7, is provided with a tongue or lug 7 which extends through an aperture 8 in the web $b$ of each of the brackets. Thus the locking washers are stationarily held on the brackets.

As shown in Fig. 2, it will be observed that the apertures 8 in the brackets are intermediately positioned between shoulders 9 and 10 formed on the portions $a$ of the attaching members so that when the windshields S are pivotally moved on the attaching members the shoulders 9 and 10 will limit the movement to predetermined extents in opposite directions.

The forward ends of the glass windshields S are provided with channeled metallic members F which carry rubber weather strips $f$ therein and these weather strips are adapted to engage the forward portions of the doors D when the windshields are disposed at their maximum angles from the faces of the doors, as shown in Fig. 1, so as to exclude the wind from the interior of the car.

Now, by reference to Fig. 4, it will be observed that the channeled portions $b'$ of the brackets B and B' are formed with substantially parallel vertical side portions 11 and 12 and an intermediate arcuately formed portion 13 at the junctions 14, 14 between the portion 13 and the sides 11 and 12 of the channels. The channels are curved on radii of sufficient length to prevent the breaking of the metal at the junction points which would very likely occur if the portion 13 was substantially at right angles to the sides 11 and 12. Furthermore, due to the arcuate form of the portion 13, when the sides 11 and 12 are sprung apart for inserting the glass shield S therein the channeled portion $b'$ will flex at points centrally of the portions 13 more readily than at the junction points 14.

The ends of the glass shield S are provided with channeled packing strips, as at P, of rubber, felt, or other suitable material, so as to absorb any vibration set up in the windshields during the operation of the car and to prevent the breakage of the glass.

In order to provide against lateral movement of the glass S in the brackets B and B', the integral brackets are formed so that the ends of the channels $b'$ will be closed by means of portions 15, 15 and 16, 16 respectively. The end portions, however, are spaced apart so as to provide vertically disposed spaces 17 and 18 respectively to permit the free flexing of the channeled portions $b'$ when the glasses are inserted therein. The spaces 18 on the forward ends of the bracket also permit the weather strips $f$ to extend upwardly and downwardly into the brackets for the full length of the windshields S.

It will be understood that the brackets B and B' are stamped out of sheet metal by suitable dies. In the stamping operation the forward ends of the brackets are provided with slightly widened portions 19 so as to accommodate the weather strip holders F.

It will be observed from the foregoing description of my invention that the air deflectors or windshields S, when positioned as shown in Fig. 1 during the movement of the car, will deflect the air currents outwardly and rearwardly from the openings O of the doors D when the windows are open. The windshields, being mounted on the doors, will swing with the doors, and therefore the opening of the doors will not be interfered with when the deflectors are in use.

It is also apparent that when it is desirable to ventilate the interior of the car the windshields S may be pivotally swung into position with their forward edges spaced from the faces of the doors so as to permit the inrush of air to a more or less extent as may be desired.

What I claim is:

1. An auxiliary windshield comprising a pair of brackets, attaching members pivotally secured to said brackets and attachable to a vehicle door above and below the window opening therein, a glass windshield supported in said brackets, and means for frictionally connecting said brackets and said attaching members for supporting said windshield at selected angles, and locking discs co-axially mounted on said brackets and said attaching members and stationarily held on said brackets, said attaching members having shoulders engaging portions of said locking discs for limiting the movement of said windshield in opposite directions.

2. An auxiliary windshield for motor cars comprising an integral metal bracket having a supporting web portion bent downwardly at one of its sides, and thence outwardly on a curve, and thence upwardly to provide a channeled portion, and a glass shield adapted to seat in said channeled portion and to be held therein by the tension of the sides of said channel, said sides being bent inwardly over the ends of said channel.

3. In a windshield, a supporting bracket comprising a horizontally disposed web bent at one of its sides to form a channel for supporting a shield in position for use, both sides of said channel being integral with said web and capable of being spread apart to receive and hold a shield in the channel under the tension of the sides of the channel, said sides being bent inwardly to close the ends of the channel.

LEO M. HARVEY.